(12) United States Patent
Shin et al.

(10) Patent No.: US 11,292,321 B2
(45) Date of Patent: Apr. 5, 2022

(54) SLIDING SUN VISOR HAVING SLIM STRUCTURE

(71) Applicants: Hyundai Motor Company, Seoul (KR); Kia Motors Corporation, Seoul (KR)

(72) Inventors: Han Shin, Seoul (KR); Kang-Ho Joo, Seoul (KR); Bon-Min Koo, Chungcheongnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/010,320

(22) Filed: Sep. 2, 2020

(65) Prior Publication Data

US 2021/0260973 A1 Aug. 26, 2021

(30) Foreign Application Priority Data

Feb. 26, 2020 (KR) .......................... 10-2020-0023749

(51) Int. Cl.
*B60J 3/02* (2006.01)

(52) U.S. Cl.
CPC ............ *B60J 3/0239* (2013.01); *B60J 3/0278* (2013.01)

(58) Field of Classification Search
CPC ....... B60J 3/0239; B60J 3/0265; B60J 3/0278
USPC ......................................................... 296/97.11
See application file for complete search history.

(56) References Cited

U.S. PATENT DOCUMENTS

| 8,434,811 | B2 * | 5/2013 | Rockafellow | .......... B60J 3/0239 |
| | | | | 296/97.11 |
| 9,186,962 | B2 * | 11/2015 | Huff | .......... B60J 3/023 |
| 2017/0341492 | A1 * | 11/2017 | Bernard | .......... B60J 3/0278 |

FOREIGN PATENT DOCUMENTS

KR 2005-0106603 A 11/2005

* cited by examiner

*Primary Examiner* — Joseph D. Pape
(74) *Attorney, Agent, or Firm* — Mintz Levin Cohn Ferris Glovsky and Popeo, P.C.; Peter F. Corless

(57) ABSTRACT

A sliding sun visor having a reduced thickness is provided. The visor includes a sliding housing provided on a sun visor body and installed to be movable in an axial direction of a pivot arm. A clamp is installed in the sliding housing to be fixed to the pivot arm and configured to guide and support a movement of the sliding housing when the sliding housing slides, in which a guide, which is a substitute for the sliding housing, is installed at an inner-upper end of the sun visor body to minimize a width of the sliding housing that surrounds the pivot arm. The guide includes a guide rail integrally formed at the inner-upper end of the sun visor body, a clamp housing moving together with the sun visor body along the guide rail, and a clamp installed in the clamp housing and sliding on the pivot arm.

5 Claims, 6 Drawing Sheets

SLIDING SUN VISOR HAVING SLIM STRUCTURE

CROSS-REFERENCE TO RELATED APPLICATIONS

This application claims priority under 35 U.S.C. § 119 to Korean Patent Application No. 10-2020-0023749, filed on Feb. 26, 2020, the disclosure of which is incorporated herein by reference in its entirety.

BACKGROUND

1. Field of the Disclosure

The present disclosure relates to a sliding sun visor having a slim structure, and more particularly, to a sliding sun visor having a slim structure that prevents a clamp coupling unit from being rattled and damaged due to a lack of rigidity and significantly reduce a width of the sun visor.

2. Description of the Related Art

In general, a sun visor for a vehicle is installed at an upper side of a wind shield glass to prevent sunlight from shining directly onto a driver and an occupant. The sun visor broadly includes a pivot arm fixed at a ceiling side of a vehicle, and a sun visor body installed on the pivot arm. Therefore, the pivot arm is rotated to maintain the sun visor body in close contact with the ceiling side of the vehicle at normal times. When the sunlight shines, the pivot arm is rotated to unfold the sun visor body from the ceiling side to block the sunlight. In particular, in addition to the operation of folding and unfolding the sun visor body from the pivot arm, the sun visor body may be slid along an axial direction of the pivot arm and adjusted to position the sun visor body between a user and an inflow direction of light.

A related art related to a sun visor sliding device discloses a sun visor, a sliding operation of which is intermittently performed. In the case of the sliding sun visor, gear grooves of a sliding housing are formed over an overall length of a movement section, and a flat spring of an intermittently operating part is maintained caught by the gear groove by elastic force. When the sliding housing moves, the flat spring of the intermittently operating part climbs over the gear groove while applying consistent elastic force. For this reason, there is a disadvantage in that the sliding operation of the sun visor body is not smoothly performed and rattling noise consistently occurs, which causes a deterioration in sliding performance of the sun visor.

FIGS. 1 to 3A-3B illustrate a sun visor 1 developed and installed in a vehicle to solve the above-mentioned problems. In other words, a sun visor body 50 is installed on a sliding pipe 10 and rotates forward and rearward or slides to the left and right. For example, as illustrated in FIG. 2, the sun visor body 50 is coupled to a coupling portion 11 that is elongated and protrudes in a "T" shape in a longitudinal direction from the sliding pipe 10. A clamp 20 having a U shape is installed in the sliding pipe 10 to operate to the left and right in the sliding pipe 10. In particular, the sliding pipe 10 is coupled, at both sides, to first and second caps 30 and 31.

As illustrated in FIG. 3A, when a load is repeatedly applied to the sun visor 1 having the aforementioned structure due to the consistent rotation, tensile force (e.g., bending force) is applied between the clamp 20 and the sun visor body 50, as illustrated in FIG. 3B. The tensile force (e.g., bending force) is applied because the coupling portion between the clamp 20 and the sun visor body 50 lacks rigidity, and the coupling portion tends to rattle over time and be finally damaged.

Since the clamp 20 is structured to surround the entire sliding pipe 10, a thickness (width) at most about 20 mm is maintained, which causes a coarse shape of the sun visor. To reduce the overall size or thickness of the sun visor, the thickness of the sun visor is reduced to at least about 16 mm by removing a width (injection-molding thickness) of the sun visor. However, rigidity of the coupling portion deteriorates, which results in persistent claims from consumers.

As illustrated in FIG. 1, in the case of the sun visor, the sun visor body 50 formed by injection molding requires the two caps, i.e., the first and second caps 30 and 31 basically made of aluminum in order to maintain the structure that surrounds the sliding pipe 10. In addition, at least three fastening screws are required to configure the sun visor. For example, the second cap 31 is installed to be connected to a bracket (not illustrated) installed on a ceiling, and the second cap 31 is coupled to a pivot arm 40 inserted into the clamp 20. The first cap 30 is coupled to the other end, i.e., the tip of the pivot arm 40 and coupled to the sun visor body 50. Therefore, the first and second caps 30 and 31 are necessary components.

In the case of other sliding sun visors, at least four non-woven tapes for preventing a level difference are used to prevent a level difference from the aluminum pipe. Accordingly, the present disclosure provides a sliding sun visor, as a solution for solving the above-mentioned problems, in which a structure of the sun visor is changed so that an aluminum cap or a non-woven tape for preventing a level difference, which is used in the related art, is not used, thereby reducing weight and costs.

SUMMARY

The present disclosure has been made in an effort to reduce a thickness of a sun visor by providing an L-shaped guide unit which is a substitute for a sliding housing used for a sun visor in the related art. The present disclosure has also been made in an effort to reduce a weight and costs by not using an aluminum cap or a non-woven tape for preventing a level difference which is used for a sun visor in the related art. The above-mentioned objects and other objects of the present disclosure all may be achieved by the present disclosure to be described below.

The present disclosure provides a sliding sun visor having a slim structure in a sun visor sliding device and may include: a sliding housing provided on a sun visor body and installed to be movable in an axial direction of a pivot arm; and a clamp installed in the sliding housing to be fixed to the pivot arm and configured to guide and support a movement of the sliding housing when the sliding housing slides, in which a guide, which is a substitute for the sliding housing, is installed at an inner-upper end of the sun visor body to minimize a width of the sliding housing that surrounds the pivot arm, and in which the guide may include: a guide rail integrally formed at the inner-upper end of the sun visor body; a clamp housing configured to move together with the sun visor body along the guide rail; and a clamp installed in the clamp housing and configured to slide on the pivot arm.

The following effects may be obtained by the sliding sun visor having the slim structure according to the present disclosure.

First, it may be possible to reduce the thickness of the sun visor body by substituting the "L"-shaped guide for the structure in the related art in which the sliding housing surrounds the pivot arm and an increase in injection-molding thickness is caused.

Second, it may be possible to reduce a weight and costs by eliminating an aluminum cap and screws or a non-woven tape for preventing a level difference which forms the sun visor in the related art.

Third, the sliding type in the related art, in which the pivot arm is positioned inside the sliding housing and the clamp moves the sliding housing, is changed to a type according to the present disclosure in which the sun visor body is directly moved using the tension structure of the clamp, such that it may be possible to improve operating properties and wear resistance performances during the movement.

Fourth, the guide may be installed inside the sun visor body, such that no tensile/bending force is applied when the sun visor body is repeatedly rotated upward and downward.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
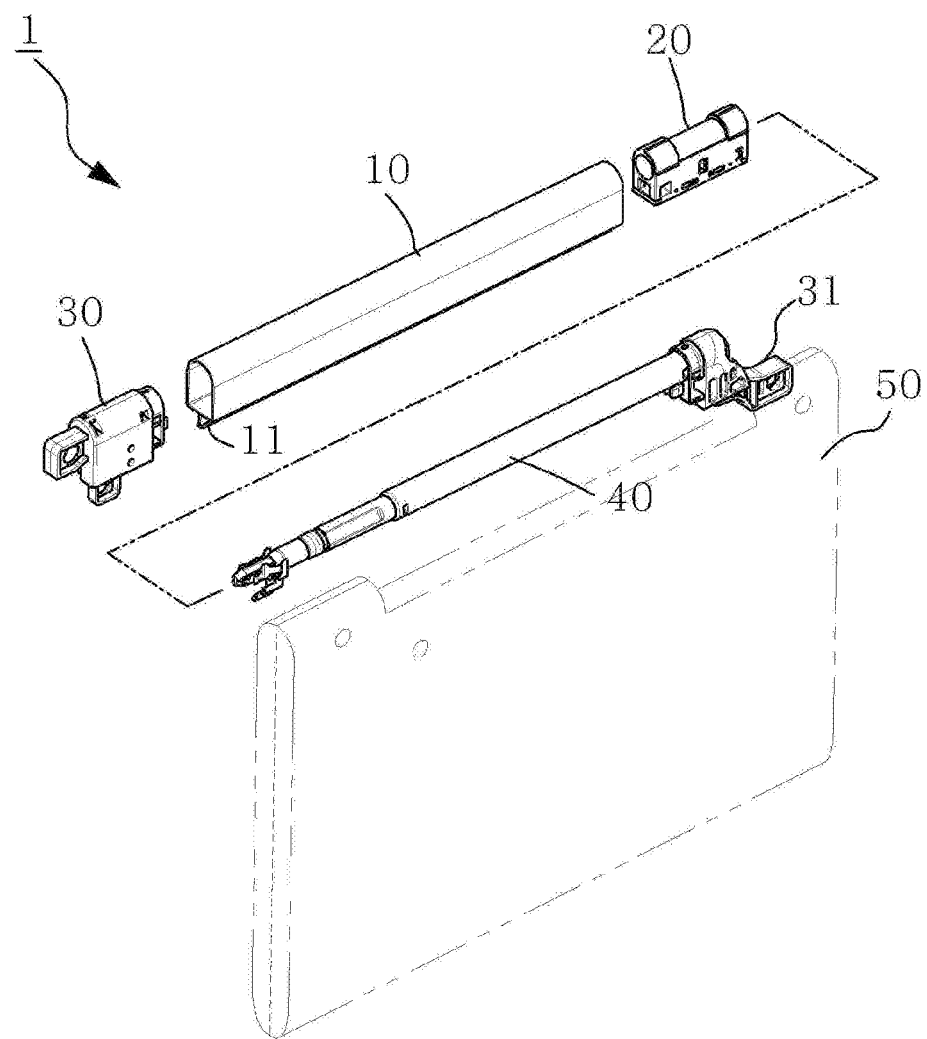
FIG. 1 is an exploded perspective view illustrating a configuration of a sliding sun visor in the related art.
Figure 2:
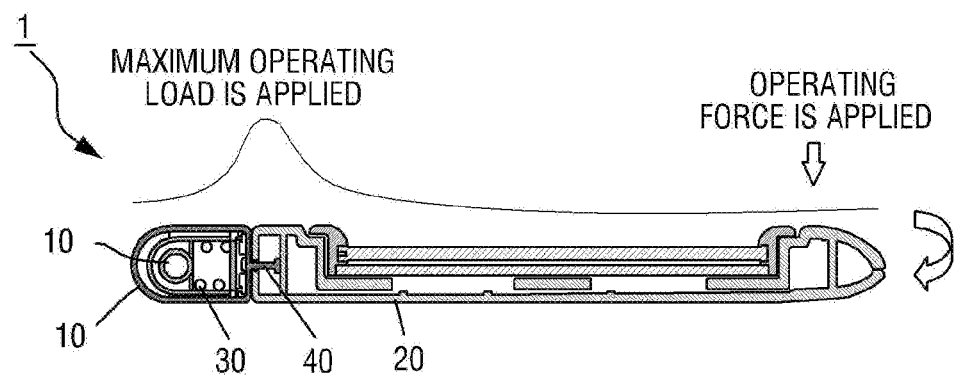
FIG. 2 is a cross-sectional view illustrating the sun visor in the related art.
Figure 3A:
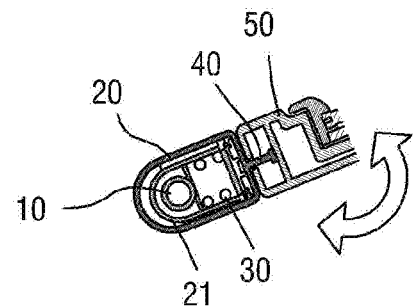
FIGS. 3A and 3B are views illustrating an operation of the sun visor in the related art.
Figure 3B:
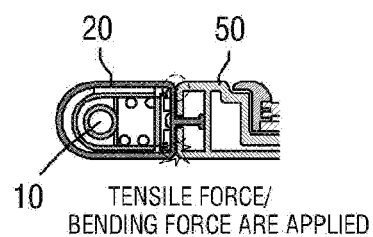

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present disclosure will be described in detail with reference to the accompanying drawings so that those skilled in the technical field to which the present disclosure pertains may easily carry out the present disclosure. However, the present disclosure may be implemented in various different ways, and is not limited to the exemplary embodiments described herein.

A part irrelevant to the description will be omitted to clearly describe the present disclosure, and the same or similar constituent elements will be designated by the same reference numerals throughout the specification. In addition, terms or words used in the specification and the claims should not be interpreted as being limited to a general or dictionary meaning and should be interpreted as a meaning and a concept which conform to the technical spirit of the present disclosure based on a principle that an inventor can appropriately define a concept of a term in order to describe his/her own disclosure by the best method.

Figure 4:
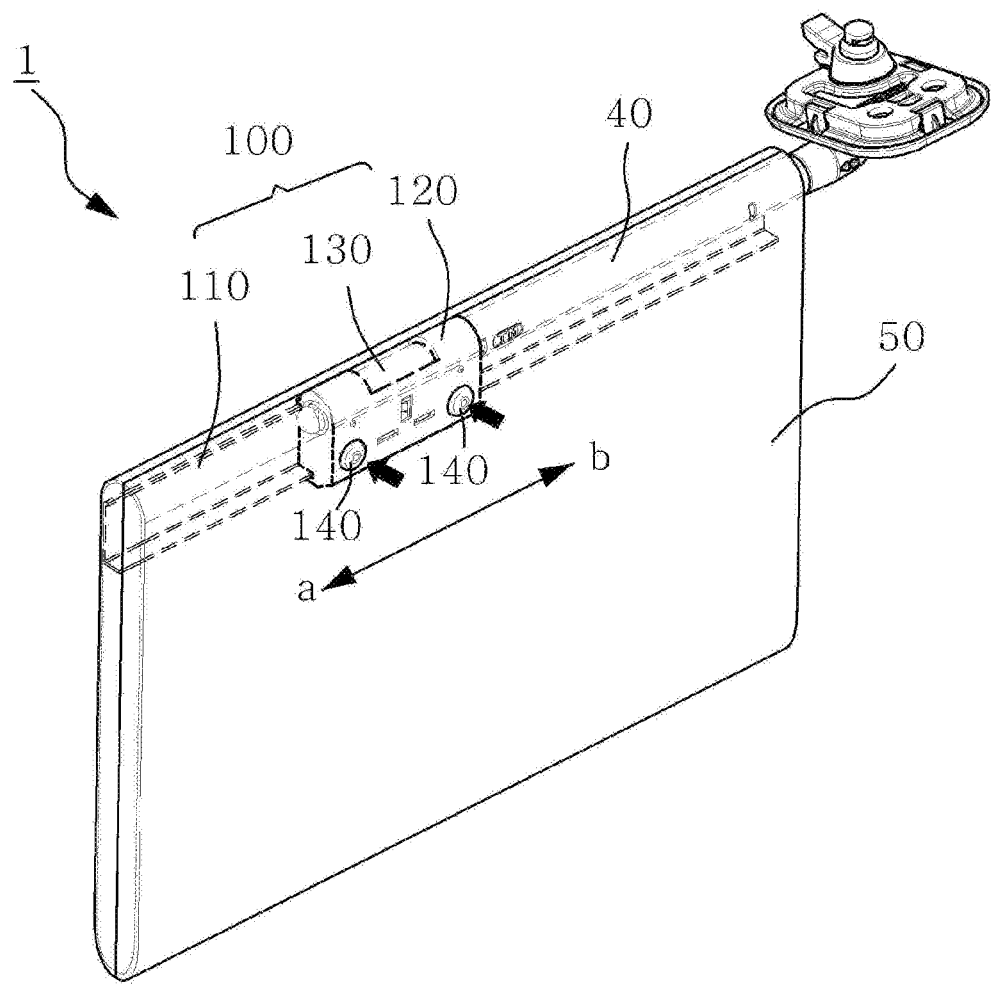
FIG. 4 is a perspective view illustrating a configuration of a sliding sun visor according to the present disclosure.

As illustrated in FIG. 4, a sliding sun visor 1 having a slim structure according to the present disclosure similarly constitutes a sun visor sliding device that may include a sliding housing provided on the sun visor body and installed to be movable in an axial direction of a pivot arm, and a clamp installed in the sliding housing to be fixed to the pivot arm and configured to guide and support a movement of the sliding housing when the sliding housing slides. However, the present disclosure differs from the related art in that a guide 100, which is a substitute for the sliding housing, may be installed at an inner-upper end of the sun visor body 50 to minimize a width of the sliding housing that surrounds a pivot arm 40.

Figure 5:
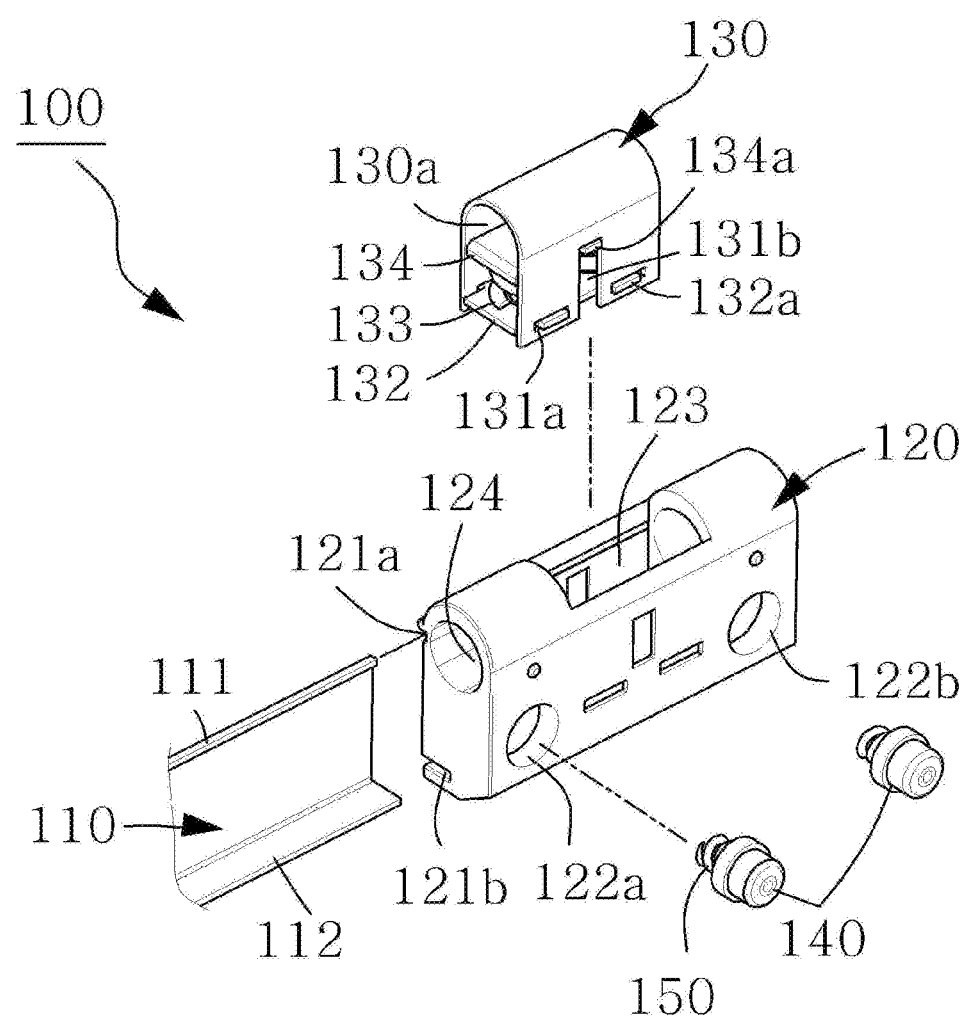
FIG. 5 is a view illustrating a state in which only a guide moving means according to the present disclosure is extracted.

As illustrated in FIG. 5, the guide 100 may include a guide rail 110 integrally formed at the inner-upper end of the sun visor body 50, a clamp housing 120 configured to move together with the sun visor body 50 along the guide rail 110, and a clamp 130 installed in the clamp housing 120 and configured to slide on the pivot arm 40. The guide rail 110 may be injection-molded to be elongated in an approximately "L" shape when viewed from the lateral side.

Guide protrusions 111 and 112 may be formed at upper and lower ends of the guide rail 110, respectively. Guide grooves 121a and 121b may be formed at upper and lower ends of the clamp housing 120, respectively, and the guide grooves 121a and 121b may be caught by and fitted with the guide protrusions 111 and 112 of the guide rail 110. Additionally, a plurality of apertures 122a and 122b may be formed at an interval at the other side of the clamp housing 120, and a pair of buttons 140, which protrudes to the outside of the sun visor body 50, may be installed in the apertures 122a and 122b. An insertion aperture 123, into which the clamp 130 is inserted, may be formed at an upper end of the clamp housing 120. A shaft aperture 124, into which the pivot arm 40 is inserted, may be formed in the axial direction of the clamp housing 120.

The clamp 130 may include a housing body 131 having fixing apertures 131a formed at intervals at lower sides of two sidewalls, and guide apertures 131b formed vertically between the fixing apertures 131a, a support plate 132 having catching protrusions 132a coupled to the fixing apertures 131a formed in the housing body 131, and a first elastic member 133 installed on the support plate 132, and a pivot-arm pushing plate 134 installed on the first elastic member 133 and disposed to be in close contact with the pivot arm 40 by elasticity of the first elastic member 133, the pivot-arm pushing plate 134 having guide protrusions 134a formed at both ends thereof to cause the pivot-arm pushing plate 134 to move upward or downward by being guided by the guide apertures 131b as the first elastic member 133 is compressed or stretched. In the drawing, non-described reference numeral 130a is a space through which the pivot arm 40 passes.

Figure 6:
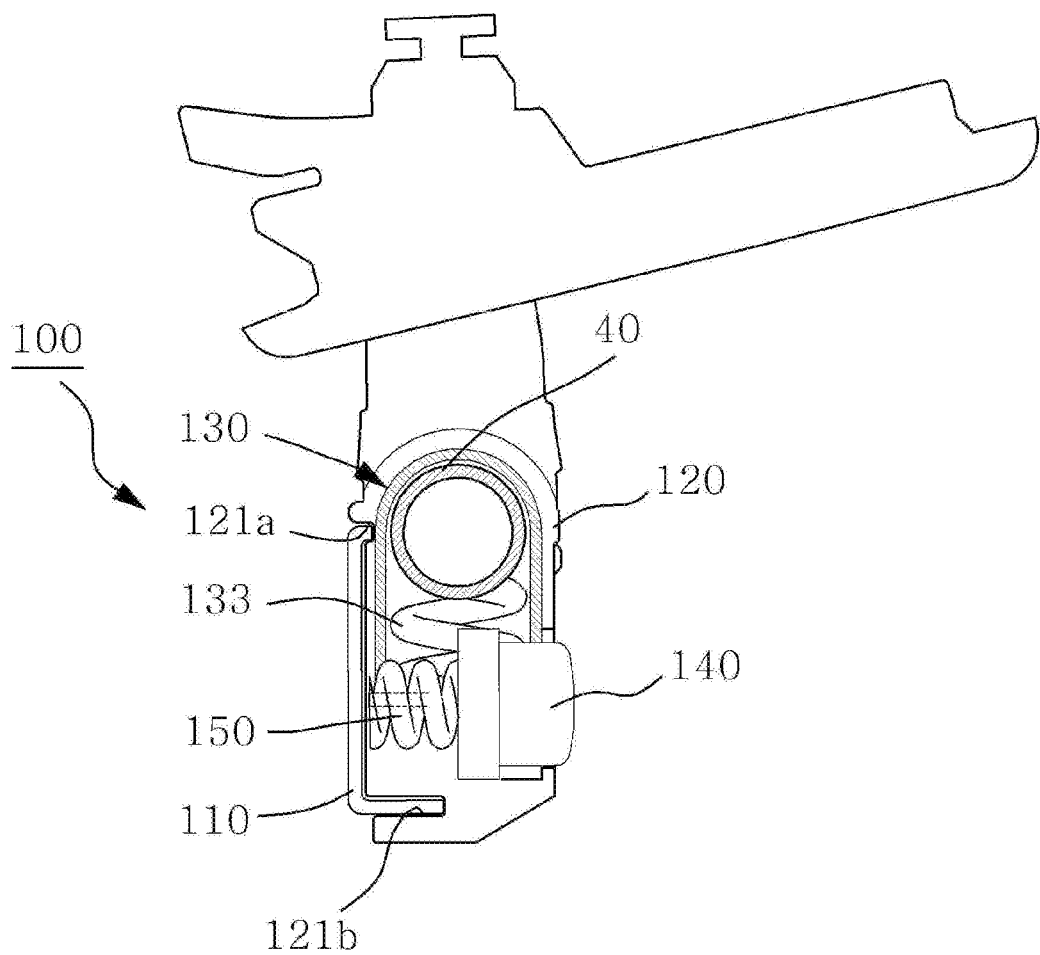
FIG. 6 is a view illustrating a cross section of the guide moving means according to the present disclosure.

As illustrated in FIG. 6, a second elastic member 150 may be installed to improve wear resistance of the buttons 140, which are installed in the clamp housing 120, against the guide rail 110 when the buttons 140 are moved toward a rear end. Therefore, as illustrated in FIG. 4, the sliding sun visor 1 having the slim structure configured as described above may be installed on a ceiling in an interior of a vehicle in the above-mentioned state.

When a driver or an occupant in a passenger seat is exposed to the sunlight, the user moves the sun visor body 50 in a direction indicated by the arrow a while pressing the buttons 140 protruding from the sun visor body 50 in a direction indicated by the thick arrow, thereby blocking the sunlight. For example, when the user moves the sun visor body 50 in the direction indicated by the arrow a orb while pressing the buttons 140, the slide body 50 may be moved directly in a desired direction in a state in which tension is applied to the guide rail 110 by the second elastic member 150 by the buttons 140.

While the present disclosure has been described with reference to the exemplary embodiment and the accompanying drawings, different exemplary embodiments may be made within the spirit and scope of the present disclosure. Accordingly, the scope of the present disclosure is defined by the appended claims and should be construed as not being limited by the specific exemplary embodiments disclosed in the present specification.

What is claimed is:

1. A sliding sun visor, comprising:
   a guide provided on a sun visor body and installed to be movable in an axial direction of a pivot arm
   wherein the guide includes:
   a guide rail integrally formed at an inner-upper end of the sun visor body;
   a clamp housing configured to move together with the sun visor body along the guide rail; and
   a clamp installed in the clamp housing and configured to slide on the pivot arm,
   wherein the guide rail includes guide protrusions formed at upper and lower ends of the guide rail, respectively,
   wherein the clamp housing includes guide grooves caught by and fitted with the guide protrusions of the guide rail, and
   wherein an insertion aperture, into which the clamp is inserted, is formed at an upper end of the clamp housing.

2. The sliding sun visor of claim 1, wherein the guide rail is injection-molded to be elongated in an L-shape.

3. The sliding sun visor of claim 1, wherein a plurality of apertures, in which a pair of buttons protruding to the outside of the sun visor body is installed, are formed at intervals at another side of the clamp housing, and wherein a shaft aperture, into which the pivot arm is inserted, is formed in an axial direction of the clamp housing.

4. The sliding sun visor of claim 1, wherein the clamp includes:
   a housing body having fixing apertures formed at intervals at lower sides of two sidewalls, and guide apertures formed vertically between the fixing apertures;
   a support plate having catching protrusions coupled to the fixing apertures formed in the housing body;
   a first elastic member installed on the support plate; and
   a pivot-arm pushing plate installed on the first elastic member and disposed to be in close contact with the pivot arm by elasticity of the first elastic member, the pivot-arm pushing plate having guide protrusions formed at both ends thereof to move the pivot-arm pushing plate upward or downward by being guided by the guide apertures as the first elastic member is compressed or stretched.

5. The sliding sun visor of claim 3, wherein a second elastic member is installed to improve wear resistance of the buttons, which are installed in the clamp housing, against the guide rail when the buttons are moved toward a rear end.

* * * * *